Patented July 15, 1947

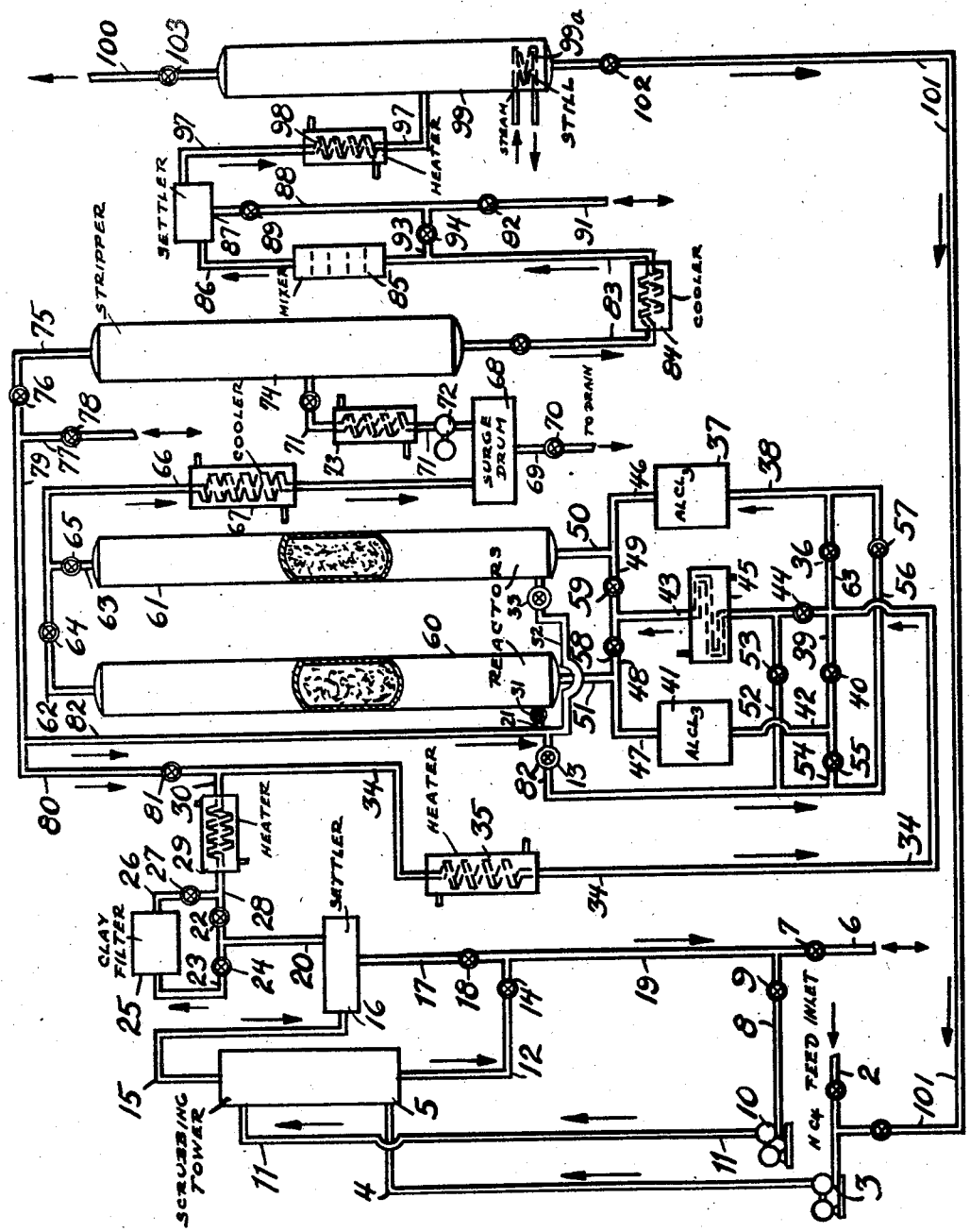

2,423,845

UNITED STATES PATENT OFFICE 2,423,845

METHOD OF INCREASING THE USEFULNESS OF SOLID ISOMERIZATION CATALYST MASSES

Norval F. Myers, Short Hills, N. J., assignor to Standard Oil Development Company, a corporation of Delaware Application March 21, 1942, Serial No. 435,630

30 Claims. (Cl. 260—683.5)

This application is a continuation in part of co-pending application U. S. Serial No. 422,820, filed December 13, 1941, by Norval F. Myers.

The present invention relates to the isomerization of paraffinic hydrocarbons, in particular straight chain or normal paraffinic hydrocarbons containing at least four carbon atoms per molecule, in particular normal butane and normal pentane, to produce the corresponding branched chain or iso paraffins catalytically by means of Friedel-Crafts type catalysts, in particular the aluminum halides such as aluminum chloride, while carrying out the reaction under isomerization reaction conditions and in the presence of promotional amounts of halogen-containing compounds.

In the isomerization of normal paraffins of at least four carbon atoms per molecule to their corresponding branched chain isomers, it is customary to employ catalysts of the Friedel-Crafts type such as, for example, zinc chloride, aluminum chloride, aluminum bromide, iron chloride and the like, in conjunction with promoters such as, for example, chlorine, bromine, hydrogen chloride, hydrogen bromide, carbon tetrachloride, chloroform, the lower alkyl halides such as, for example, methyl, ethyl, propyl, butyl chlorides and bromides and the like. Small amounts of water have also been employed for promoting this reaction. The process has heretofore been carried out chiefly in the liquid phase. In the case of normal butane, under the temperatures ordinarily employed, some superatmospheric pressure is necessary to maintain the liquid phase operation, while in the case of normal pentane pressure may or may not be used as desired. However, the difficulties encountered in liquid phase operation have made it expedient to consider and perfect a process employing vapor phase operation in which a solid bed of catalyst, for example aluminum chloride impregnated or deposited upon suitable carriers, either reactive to some extent or inert, is employed and in which the normal paraffin vapors together with promoter are allowed to pass through and in intimate contact with the bed under isomerization reaction conditions.

The present invention is concerned with the vapor phase isomerization of normal paraffins containing at least four carbon atoms per molecule or with the isomerization of branched chain paraffins to more highly branched chain paraffins. The catalyst employed is prepared by impregnating and sorbing aluminum chloride or other suitable Friedel-Crafts type catalyst on or into highly absorbent carrier substances to be more fully hereinafter described. In preparing these catalysts masses it has been found desirable, and in fact essential, to a smooth and economical operation obviating the necessity for frequent plant shutdowns, to impregnate or sorb on or in the carrier substance only sufficient aluminum chloride as will be tenaciously held in the pores of the carrier substance under the conditions of isomerization obtaining. This is expedient by reason of the fact that aluminum chloride vapors when present to any great extent in the reacted effluent from the isomerization reactor tend to condense and deposit in valves, pipes, stills and the like, necessitating the removal and shutdown for cleaning of these various pieces of equipment. Although it is preferred to make up the catalyst mass so that only tenaciously held aluminum chloride is present in the pores of the carrier, the invention is not restricted to the use of this particular type of catalyst mass but is likewise applicable to the case where aluminum chloride is present in excess of the amount required to be only tenaciously held in the pores of the carrier, in which case provision is made for the removal of the excess aluminum chloride vapors by their sorption in another mass of the carrier or the like. By the use of the expression "tenaciously held" or equivalent expressions as used in the description and appended claims, it is intended to cover a catalyst mass comprising a porous carrier and aluminum chloride in which the aluminum chloride is sorbed in and on the said porous carrier only to such an extent that appreciable amounts of aluminum chloride will not be removed from the catalyst mass upon using the same in the isomerization process hereinafter more fully described.

The present invention is concerned with the maintenance of the effective usefulness of the catalyst mass over a longer period of time than has heretofore been possible. This may be accomplished by introducing either intermittently, continuously or continuously-intermittently, vapors of aluminum chloride or other suitable Friedel-Crafts type catalyst into the catalyst mass which is catalyzing isomerization reactions. This may be accomplished in a number of ways to be more fully hereinafter disclosed. It has been found, however, that, particularly with respect to the carrier, the effective life thereof is materially lengthened, and from the economics of the process a commercial plant may be more efficiently operated by employing the improvements herein described.

It is an object of the present invention to maintain a longer effective usefulness with incident high catalytic activity of an isomerization catalyst bed, particularly in connection with its use in the vapor phase isomerization of normal paraffins of at least four carbon atoms per molecule to the corresponding isoparaffins. It is a further object of the present invention to carry out a continuous commercial process for the production of high yields of isoparaffins from their corresponding normal paraffins as economically as possible and to avoid the necessity for shutdowns due to excessive degradation of the catalyst bed and/or plugging of valves and lines with aluminum chloride deposited thereon and therein which was caused by the fact that excessive amounts of aluminum chloride were vaporized or dissolved in the effluent coming from the isomerization reaction zone or zones.

It is a further object of the invention to add and substantially completely sorb aluminum chloride or other Friedel-Crafts type catalysts in vapor form to a catalyst bed to lengthen its effective catalyst life, and yet to add these vapors in such a way as to prevent substantial loss of aluminum chloride from said bed through vaporization or solution in the reacted effluent coming therefrom. It is a further object of the invention to maintain a substantially uniform distribution of aluminum halides or other Friedel-Crafts type catalysts, particularly aluminum chloride, throughout the sorbent carrier mass. It is a further object of the invention to maintain a maximum life for the sorptive carriers employed in making up the isomerization catalyst bed. Still another object of the present invention in one of its preferred embodiments lies in preventing the degrading of aluminum chloride charged to the pick-up chamber into a nonvolatile corrosive liquid.

In order to accomplish these objects as well as others which will hereinafter appear upon a fuller and more complete understanding of the invention, the following description and explanation of the novel process follows.

Dried aluminum chloride or other suitable Friedel-Crafts type catalyst is impregnated on and sorbed in the pores of a relatively highly porous carrier such as, for example, activated carbon, diatomaceous earth, acid-treated clays such as, for example, Super Filtrol, the bentonitic clays, montmorillonite, bauxite, either partially or substantially completely dehydrated such as Porocel, activated alumina, alumina gel, silica gel, and the like, and the mixture heated to an elevated temperature, depending upon the particular carrier employed, sufficient to complete the sublimation of the less tenaciously held aluminum chloride, for example, followed by a removal of all excess or extraneously and loosely held aluminum chloride from the porous mass. The temperature under which this may be carried out is generally from 50° F. to 100° F. in excess of the highest temperature to be employed in the isomerization reaction in which the catalyst mass will be employed.

Still another method of preparing the catalyst bed is to take a suitable highly sorbent carrier of the type heretofore specified and to independently sublime or vaporize aluminum chloride and by means of a suitable carrier gas or vapor, impregnate the porous carrier with the aluminum chloride until such time and in such amounts so that the carrier is substantially completely saturated with the aluminum chloride vapors and no further sorption thereof is possible under the particular temperatures maintained. The temperatures employed may be those of the isomerization reaction or slightly lower or 50° F. to 100° F. higher than the highest temperature to be contemplated for use in the subsequent isomerization reaction zone. In general, a temperature of between about 200° F. and 400° F. is employed where normal pentane isomerizations are contemplated. In preparing a catalyst for use with normal butane isomerization, temperatures of from 250° F. to 450° F. are generally desirable for the impregnation step. The amount of aluminum chloride contained in the pores of sorptive carriers varies depending upon the particular sorptive carrier employed, but in general it will be found to range between about 8% and about 20% by weight of the catalyst mass. The aluminum chloride vapor carriers employed may be of widely varying characteristics but it is only necessary that they be gases at or above the sublimation temperatures employed for the aluminum chloride and that they be relatively inert with regard to the aluminum chloride under the conditions employed for impregnation of the aluminum chloride on porous carriers. Thus, for example, such gases as nitrogen, air, carbon dioxide, hydrogen, chlorine, hydrogen chloride, methane, ethane, propane, normal butane or isobutane and the like, may be, either singly or in admixture with one another, employed for this purpose.

One of the particularly desirable carriers which have been employed is known under the trade name of Porocel and comprises a calcined bauxite. However, for best activity it is desirable to dehydrate this calcined bauxite, or any other carrier, to a point substantially below that where water is given off under the isomerization conditions to which the carrier subsequently is subjected. The bauxite may be dried and calcined by any of the customary methods employed. The particular calcined bauxite which is preferred in the present invention is Porocel which has been previously heated for a period of about 18 hours at a temperature between about 950° F. and about 1000° F. or 2–3 hours at 1300° F. As previously stated, one of the methods of preparing the catalyst is simply to charge the isomerization reactor with the dehydrated Porocel alone and to impregnate and sorb aluminum chloride directly therein, or the Porocel may be impregnated with anhydrous aluminum chloride in a separate and independent step and the resultant catalyst may be charged to the isomerization reaction zone.

The feed stock employed in conjunction with this catalyst may be any one of a number of common types of feed stocks found in petroleum refineries. The particular feed stocks which are useful comprise essentially normal butane, normal pentane, normal hexane, normal heptane, 2-methyl pentane and higher homologues and/or mixtures of two or more of these normal paraffins as well as such natural mixtures as field butanes, casinghead gasoline and the like. The process finds its greatest utility, however, in the use of feed stocks predominating in normal butane and/or normal pentane. The process is chiefly designed to convert normal butane to isobutane although by slight alterations of reaction conditions it may be employed for the isomerization of normal pentane and the above-mentioned higher homologues thereof. Particularly when employing the higher homologues it is often desirable to employ molecular or free hydrogen in order to suppress as far as possible the cracking tendencies. The hydrogen not only serves this purpose but, as will be shown hereinafter, it is useful in serving as a carrier medium for the introduction of further quantities of aluminum chloride into the catalyst bed simultaneously with the isomerization reaction.

The isomerization reaction is carried out in the presence of suitable promoters, as heretofore mentioned. These are customarily employed in amounts ranging between about 1% and about 18%, although higher amounts may be employed without deleterious effects on the isomerization reaction. Oftentimes it is desirable to employ higher amounts of promoter, particularly where these promoters such as chlorine, hydrogen chloride and/or hydrogen, serve as the carrier medium in introducing the further quantities of aluminum chloride into the catalyst mass since by regulating the amount of carrier gas it is possible to regulate the amount of aluminum chloride being introduced into the catalyst bed.

Times of contact vary, particularly in continuous units, but in general the time of contact will be between about 0.2 and about 3 liquid volumes of feed stock per volume of catalyst per hour (30 to 600 seconds) and the temperature maintained in the reaction zone will vary depending upon the particular feed stock charged, between about 150° F. and about 400° F., preferably between about 200° F. and about 325° F., with a pressure being maintained between about atmospheric and about 350 lbs./sq. in. The adjustment of the pressure is usually determined by and confined to that pressure which will most efficiently effect a separation of hydrogen chloride in the stripping tower to which the reacted product is fed, although the pressure may be varied above or below such pressures if desired, particularly in cases where an efficient separation of hydrogen chloride for recycle to the isomerization reaction zone is not required.

These various reaction conditions are necessarily correlated with respect to one another, as heretofore mentioned, and to a marked extent depending upon the particular types of feed stocks employed. The temperature and pressures should be correlated so that at all times the conditions are maintained above the dew point of the particular feed mixture being charged to the reaction zone. The isomerization of normal butane requires slightly more drastic conditions than does the isomerization of normal pentane which has been found to be somewhat more susceptible to cracking, but the use of elemental or molecular hydrogen in the case of normal pentane isomerization will permit the use of slightly more drastic conditions because of the tendency of hydrogen to suppress the cracking of normal pentane and its isomer. For normal butane isomerization, temperatures between 250° F. and 350° F. are generally employed; and for normal pentane isomerization, temperatures of between 175° F. and 250° F. are generally employed. Furthermore, the temperature may be increased to some extent as the catalyst mass becomes degraded beyond a point where additional introduction of aluminum chloride to the catalyst mass does not maintain its activity. In such a case the temperature is raised and the reaction conditions are made slightly more drastic for a given feed stock in order to attain the greatest yield of desired product per unit of weight of aluminum chloride charged to the catalyst mass.

It has also been found expedient in carrying out a commercial operation of this type, particularly where ordinary refinery $C_4$ and/or $C_5$ feed stocks are employed, to subject the feed stocks which are known to contain water and/or olefins, such as butenes, pentenes, or lower molecular weight monoolefins, to a pretreatment with a suitable agent for the removal of water and/or olefins if they are present in objectionable quantities. Such a treatment may embody the use of concentrated sulfuric acid of the order of 98% or higher, or the use of chlorsulfonic or fluorsulfonic acid for the same purpose, or various other types of common expedients for removal of olefins. In cases where concentrated sulfuric acids are so employed, it is preferable, in order to prevent any chemical degradation of aluminum chloride by contact with small amounts of entrained sulfuric acid, to pass the feed stock so treated through a suitable filter filled with a coagulating medium in order to condition the feed for its subsequent isomerization treatment. Such substances should usually be substantially water-free and should be capable of adsorbing sulfuric acid readily. For example, activated charcoal, clay or bauxite may be employed, as well as other substances commonly employed in such treatments. This pretreatment is best carried out in liquid phase operation in which the feed stock is maintained in liquid state through the clay filter treatment. The clay filter treatment of course may be omitted if the amounts of sulfuric acid present in the treated feed stock are not sufficient to cause any appreciable disturbance of the activity of the aluminum chloride in the subsequent isomerization reaction.

The feed stock is subjected to sufficient heating to vaporize the same under the pressures obtaining and its temperature is subsequently adjusted in accordance with a number of factors. In the first place, the temperature is generally adjusted to that desired to be maintained in the reaction zone. This may be accomplished in two ways. In the first method, the normal paraffin is heated to the desired reaction temperature and it is passed into a chamber containing granular or comminuted aluminum chloride with such velocity as to vaporize and pick up the desired amount of aluminum chloride, and this aluminum chloride together with the normal paraffin vapor is introduced into the reaction zone. However, a second method is also contemplated in which only a portion of normal paraffin vapors are carried through the aluminum chloride pick-up chamber, the remaining portion of the normal paraffin vapors being bypassed directly to the isomerization reaction zone with a cooling or heating thereof in order to adjust the temperature to the desired reaction temperature. Either of these two methods are preferred since it has been found that by operating in accordance with these steps the aluminum chloride charge in the pick-up drum undergoes very little if any degradation to the black non-volatile corrosive liquid residue noted when promoter in admixture with the normal paraffin is employed for picking up the aluminum chloride. Still a further though less desirable embodiment of the process of the invention resides in admixing a portion of the promoter such as, for example, hydrogen chloride and/or chlorine and/or hydrogen with the normal paraffin vapors and conducting the mixture in whole or in part, as before, through the aluminum chloride pick-up drum where the aluminum chloride vapors are carried by these gases and vapors to the isomerization reaction zone for sorption in the catalyst mass under the isomerization reaction conditions. It has been found that once the isomerization catalyst mass has attained a composition of aluminum chloride therein between about 8% by weight and about 20% by weight, depending upon the carrier used, it is sufficient in order to maintain its activity to have the vapors entering the reaction zone contain between about 0.005% and about 0.1% by weight of aluminum chloride based on the feed, preferably between about 0.01% and about 0.05% by weight. Actually, there is no necessity for limiting the amount of aluminum chloride vapors entering the isomerization catalyst bed except that the amount should not exceed that which can be substantially completely sorbed. The upper limit, therefore, is really fixed by the capacity of the sorbent carrier to take up the aluminum chloride vapors. It is generally not desirable to introduce aluminum chloride vapors in amounts over and above that which will be substantially completely sorbed. In general, the reacted vapors leaving the isomerization zone should contain not more than about 0.004% by weight, based on the hydrocarbon feed, of aluminum chloride since under continuous operating conditions higher amounts represent unsorbed and loosely held aluminum chloride contained in the isomerization catalyst bed which tend to eventually lead to the difficulties heretofore mentioned such as line plugging, valve sticking, etc.

Still other variations of the method of introducing the aluminum chloride vapors into the isomerization catalyst bed are employed. The promoter such as, for example, hydrogen chloride, either alone or in conjunction with molecular hydrogen, may be used exclusively for picking up the aluminum chloride vapors and introducing them into the reaction zone. Preferably these promoters are introduced in the reaction zone alone or admixed with that portion of the normal paraffins which does not go through the aluminum chloride pick-up chamber.

No special type of apparatus construction is necessary in carrying out the process of the present invention. It is sufficient that equipment which has customarily been employed for vapor phase treatment of hydrocarbon with solid bed type catalyst will serve to accomplish satisfactorily the present process. Ordinarily, reactors containing supported plates or baskets for the deposition of catalyst masses and through which vapors are allowed to pass may serve as the reactors. Since the process may be carried out under superatmospheric pressure the vessels should be of the ordinary pressure type. The reactors may be a single reactor or a plurality of reactors arranged in series or parallel so that the feed stock and the unit may be continuously on-stream even though one or more reactors may be off-stream for removal of spent catalyst or its regeneration. It is preferred in the present operation to have more than one reactor and to have the reactor vertical in shape and to introduce the feed stock at the bottom thereof and allow it to flow through the catalyst mass upwardly and emerge from the reactor from the top. However, downflow operation is also possible. Multiple reactors may be employed, either in series or parallel. When it becomes necessary to discontinue the use of one catalyst mass, particularly in parallel operation, it may be cut off-stream and regenerated or replaced without interruption of the process. The reactors may also be jacketed in order to maintain their temperature, and convenient heat interchangers may be employed, particularly with respect to the introduction of the reacted effluent into the promoter stripping tower and the removal of the stripped reacted mixture therefrom.

Not only may the catalyst mass be maintained so far as its activity is concerned in the manner heretofore described, but it may likewise be prepared or regenerated in the same manner, that is, by the use of normal butane alone, for example, or with hydrogen chloride or chlorine vapors or with the chlorine-containing vapors alone, as carrier media for vaporized aluminum chloride which is introduced to reimpregnate or impregnate the Porocel or other absorbent carrier employed. In regenerating the catalyst mass it is suggested to remove substantially all carbonaceous impurities contained in the pores thereof by combustion using air or free oxygen, either undiluted or diluted, with an inert gas such as nitrogen, carbon dioxide, etc., to burn the carbonaceous material from the pores. It is then possible to reimpregnate the pores of the carrier with aluminum chloride vapors as previously described.

In order to more fully understand the character of the invention, reference is had to the accompanying drawing which represents more or less diagrammatically in sectional elevation a plant set-up designed to carry out the present invention.

For purposes of illustration the process will be specifically confined to the treatment of a feed stock initially containing normal butane and traces of water and olefins. The catalyst employed will be granular, substantially anhydrous aluminum chloride; and the carrier, substantially dehydrated Porocel. A typical feed stock having a composition roughly of about 92% normal butane, 0.5% propane, 0.5% pentane, and containing 0.01% $H_2O$ and 0.1% of $C_4$ olefins, the remainder being isobutane, was fed through line 2 by means of pump 3 and line 4 into a scrubbing tower 5 filled with Raschig rings, broken stoneware, glass and the like, through which concentrated sulfuric acid having a concentration between about 96% and 100%, preferably about 98%, was introduced into scrubbing tower 5 by means of lines 6, 8 and 11 controlled by valves 7 and 9, and conveyed to the scrubbing tower 5 by means of pump 10. The feed stock in the liquid phase was withdrawn from scrubbing tower 5 through line 15 while the sulfuric acid was withdrawn from the tower through line 12 controlled by valve 14. This acid may be returned to the scrubbing tower through lines 19, 8 and 11 or it may be withdrawn from the system through lines 19 and 6, valve 9 remaining closed, and may be utilized in a number of ways such as in the production of alcohols and esters through hydrolysis of the acid sulfates contained therein, or it may be sent to an alkylation unit where this acid containing the acid sulfates is subjected to alkylation in the presence of isoparaffins. The overhead from scrubbing tower 5 is conducted through line 15 into a settling zone 16 which may contain gravel or other inert solid material so as to facilitate the speedy and complete separation of acid from hydrocarbon. This acid may likewise either be withdrawn from the system by means of lines 17, 19 and 6 or returned to the scrubbing tower by means of lines 17, 19, 8 and 11, the valves being suitably manipulated for the desired procedure. The normal butane substantially free of water and olefins is then conducted by means of line 20 either to a filtering treatment in zone 25 or it may be conducted directly to the isomerization unit through line 28 controlled by valve 22. If the material is subjected to a filtering treatment to remove the last traces of sulfuric acid it is passed through line 23, controlled by valve 24, through the filter 25 and from there through line 26, controlled by valve 27, into line 28, and from there into heater 29 wherein the temperature of the normal butane is raised to such a point as to maintain substantially all of the normal butane in the vapor phase under the pressure maintained in the system. This usually is under 300 lbs./sq. in. and the heater is designed to heat up the normal butane to about 240° F. The normal butane vapors are then passed through lines 30 and 34 to a second heater 35 where their temperature is adjusted so as to insure that they will remain in the vapor phase under the reaction conditions and so as to be capable of carrying the desired quantity of aluminum chloride vapors into the isomerization reactor. The temperature customarily attained in this second heater is approximately 300° F. and the pressure about 250 lbs./sq. in. These vapors are then passed to the reactor through line 34 by several alternative methods. They may either go to one or both of the aluminum chloride pick-up drums 41 and 37 by means of lines 39 and 42, controlled by valve 40, and lines 43 and 38, controlled by valve 36, or they may go directly into the isomerization reaction zones 60 and/or 61 by passing through open valve 44, line 43, lines 46 and 51, controlled by valve 58, and lines 49 and 50, controlled by valve 59, in which case they go through a heater or cooler 45 which is designed to properly adjust the final temperature of the normal butane going to the isomerization reaction zones 60 and/or 61, or these normal butane vapors may be split, a portion of them going through aluminum chloride pick-up drums 37 and/or 41 and the remaining portion thereof going through line 43 as previously described.

Hydrogen chloride, or chlorine and/or elemental or free hydrogen is introduced into the system through line 77, controlled by valve 78, and is introduced into the isomerization zone by the following alternative methods: From line 79 it is conducted to line 80, controlled by valve 81, where it is admixed with the normal butane vapors coming from the first heater and is subjected to the second heat treatment in heater 35 and then follows the same path as described above with normal butane vapors or the hydrogen chloride, or chlorine and/or hydrogen when valve 81 is closed may go through line 82 and be directly and separately introduced into the isomerization reaction zones by means of line 52, controlled by valve 53, in which case it enters the isomerization reaction zones through line 43 after first being subjected to a heating or cooling temperature adjustment. Or the promoter may go through line 54, controlled by valve 55, and pass through aluminum chloride pick-up drum 41, or it may go, with valves 53 and 55 closed, through line 56, controlled by valve 57, into aluminum chloride pick-up drum 37, in which case the promoters serve as gaseous media for the introduction of the aluminum chloride vapors into the isomerization reaction zone. The gases and vapors coming from pick-up drums 37 and 41 are charged to isomerization reaction zones 60 and 61 through lines 46 and 50, and 47 and 51. The temperature in the isomerization reaction zones 60 and 61 which are maintained as illustrated in the drawing in parallel operation is about 300° F. and the pressure is about 250 lbs./sq. in. The amount of aluminum chloride leaving pick-up drums 37 and 41 and entering reactors 60 and 61 is regulated so that it first will replace the small amount of aluminum chloride which is vaporized from the sorptive carrier and is thus lost from the reactors, and will also replace the aluminum chloride on the carrier at least as rapidly as this sorbed aluminum chloride is degraded and loses its activity. However, the amount of aluminum chloride added should not exceed that which can be sorbed by and substantially retained by the carrier in the reactors. This amount of aluminum chloride to be added to the reactors is controlled either by regulating the temperature under which the aluminum chloride drums are operated, or by controlling the flow of hydrocarbon and/or promoter vapors passing through the aluminum chloride drums, or by controlling the amount and frequency with which aluminum chloride is added to these aluminum chloride drums.

The operation of aluminum chloride pick-up drums 37 and 41 is such that the amount of gases going through the pick-up drums, together with the temperature under which the drums are maintained, together with the amount of aluminum chloride contained therein, is such as to maintain a substantially constant rate of flow particularly in a continuous operation of the unit, so that the activity of the catalyst mass in reactors 60 and 61 is maintained at a uniformly high level within practical limits. The variation in the operation of pick-up chambers or drums 37 and 41 permits of the control of various factors all directed to the ultimate amount of aluminum chloride going to the catalyst bed. The temperature on the pick-up chambers or drums may be varied somewhat from the 300° F. indicated. The amount of feed stock and/or promoter passing through the pick-up drums may be varied to give the desired amount of aluminum chloride. In other words, the normal butane vapors or the promoter vapors and gases may be supplied so that a portion of one or both of these types of vapors and gases goes through the pick-up drum while the remainder goes directly to the isomerization reaction zones, or all of the promoter or all of the vapors or both go to the pick-up drums and the amount of aluminum chloride or its temperature may be varied. The aluminum chloride removed from the pick-up drum may be controlled by intermittently removing large amounts or continuously removing small and controlled amounts.

As heretofore stated, the catalyst mass or bed maintained in the reactors 60 and 61 is sorbed aluminum chloride on Porocel which has been substantially completely dehydrated. The normal butane and promoter passing through at the rate of about 1 v./v./hr. is passed through upwardly and discharged through line 62, controlled by valve 64, and/or line 63, controlled by valve 65, and the effluent coming through line 66 is cooled by means of cooler 67 and passed through a surge drum 68 maintained at a temperature of about 160° F. and a pressure of 240 lbs./sq. in. where the reactor product is condensed and temporarily stored to provide a steady feed to the stripper 74. Any sludge or heavy degradation products formed and present in the reactor effluent entering the drum 68 may be settled to the bottom of the drum and withdrawn through line 69, controlled by valve 70. The paraffinic reacted mixture together with promoter is then passed through line 71 by means of pump 72 through a heater 73 and introduced into stripper 74 containing Raschig rings or plates (not shown) by means of line 71. Stripper 74 is maintained at a temperature of about 155° F. at the top and about 240° F. at the bottom and is under a pressure of between about 300 and about 350 lbs./sq. in. This facilitates the removal of hydrogen chloride and/or hydrogen and chlorine overhead through line 75, controlled by valve 76, and it may be either withdrawn from the system in whole or in part through line 77, controlled by valve 78, or recycled to the isomerization unit through line 79 as heretofore described. Fresh promoter in the desired amount may likewise be added through 77 controlled by valve 78. The stripped reaction mixture is conducted from stripper 74 through line 83 into cooler 84 and from thence into mixer 85 where it is intimately admixed with caustic soda solution introduced into the system through lines 91 and 93, controlled by valves 92 and 94. This treatment with caustic is designed to remove any small traces of aluminum chloride and/or promoter dissolved or entrained therein and the caustic is separated from the hydrocarbons passing from the mixer 85 through line 86 into settler 87, the caustic being removed through line 88, controlled by valve 89. This caustic may either be returned to the mixer for the treating of further quantities of stripped hydrocarbon reaction product by means of line 93, controlled by valve 94, or it may be withdrawn from the system by line 91, controlled by valve 92. The neutralized and stripped hydrocarbon reaction product is withdrawn through line 97 and heated by means of a heater 98 up to the required temperature and introduced into still 99 equipped with a heating coil 99a where a separation between isobutane and normal butane is effected, the isobutane coming off overhead through line 100, controlled by valve 103, and unreacted normal butane is withdrawn from the bottom through line 101, controlled by valve 102, and is either withdrawn from the system by means not shown or recycled to the isomerization unit by means of line 101 back to feed line 2 where it is sent to the sulfuric acid scrubbing system to remove any water which may have been formed during its treatment in the system or which may have been taken up in the caustic treatment in mixer 85.

The isobutane then may be employed in an alkylation unit or it may be employed in any number of ways conventionally known.

Having thus fully described the general aspects of the novel isomerization process, the following example is given in order to afford a more complete understanding of the specific character of the invention, although it is specifically desired that the invention be not limited thereto.

*Example 1*

An isomerization catalyst was prepared by charging to the reactor about 1.5 lbs. of anhydrous aluminum chloride and by placing thereover about 11 lbs. of low iron content, substantially completely dehydrated Porocel which had previously been subjected to a temperature of about 1000° F. for about 24 hours. The charge was then maintained at atmospheric pressure and a temperature of between about 250° F. and 325° F. while introducing normal butane vapors for about 24 hours through the bottom of the reactor. After this treatment and up to about the first 200 hours 6 weight percent hydrogen chloride was admixed with the n-butane charged and the temperature was gradually raised from the initial 250° F. up to about 350° F. After 200 hours under these conditions, the feed mixture of normal butane and hydrogen chloride in the same percentages was passed at a rate of about 1 liquid volume of feed per volume of catalyst space per hour through anhydrous granular aluminum chloride in a separate chamber at a temperature of about 230–250° F., and the resulting mixture of normal butane, hydrogen chloride and aluminum chloride vapors was passed through the catalyst contact bed at the rate heretofore described while the temperature of the reactor was maintained at about 350° F. Under these conditions the yield of isobutane averaged about 50% by volume even after about the one-hundredth hour of operation in this manner. The temperature of the reactor was then reduced to about 300° F., said temperature being maintained at this point through the remainder of the run. The higher temperature was maintained in an effort to determine the amount of aluminum chloride vapors which were coming overhead and which represented aluminum chloride not tenaciously held in the catalyst mass. It was found, however, that only about 0.001% to about 0.004% by weight of the feed represented aluminum chloride leaving the reactor. The yield of isobutane when the reactor was maintained at about 300° F. was found to average about 40% by volume based on the liquid hydrocarbon fed.

From time to time additional charges of anhydrous, granular aluminum chloride were added to the pick-up drum through which the normal butane-hydrogen chloride mixture was passed prior to its introducttion into the reactor. The weight per cent of aluminum chloride based on the liquid normal butane fed and added to the reactor varied somewhat depending upon the quantity of aluminum chloride present in the pick-up drum, and ranged between about 0.002% and about 0.15%, the average being about 0.01%. At no time, however, did the amount of aluminum chloride contained in the effluent rise above 0.004% by weight of the feed. After about 800 hours the run was discontinued, although the catalyst mass was by no means spent so far as its isomerization activity was concerned.

The aluminum chloride pick-up should be maintained at a temperature above about 185° F., preferably between about 230° F. and the isomerization reactor temperature.

As illustrative of an experiment wherein among other methods the preferred method of introducing aluminum chloride by means of the feed stock alone and to the exclusion of hydrogen chloride was employed, the following example is given:

*Example 2*

An isomerization catalyst was prepared by charging to the reactor about 1.15 lbs. of anhydrous aluminum chloride and by placing thereover about 11 lbs. of low iron content, substantially completely dehydrated Porocel (less than 2% moisture) which had been previously subjected to a temperature of about 1000° F. for about 24 hours. This mixture was then blown from the bottom with normal butane vapors for about 24 hours at a temperature of about 300° F.

and under superatmospheric pressure. The catalyst composition then amounted to about 12 weight per cent of aluminum chloride and about 88 weight per cent of the dehydrated Porocel and all of the aluminum chloride was substantially tenaciously held in the pores of the Porocel.

A feed stock comprising about 93.1 volume per cent of normal butane, about 6.6 volume per cent of isobutane and about 0.3 volume per cent of $C_5$ and heavier paraffins was fed at a rate of between about 0.92 and about 1.06 liquid volumes of normal butane vaporized feed per volume of catalyst per hour upwardly through the catalyst bed with about 6 weight per cent of hydrogen chloride in a separate stream to a reactor. The pressure on the isomerization reactor was maintained at about 200 lbs./sq. in. and the run was carried out for a total number of hours of 663. During the first few hundred hours of the run the reactor temperature was raised gradually from about 250° F. to about 300° F. so as to maintain approximately a 40% conversion or yield of isobutane. The aluminum chloride addition was started as soon as the activity appeared to be dropping off when the reactor temperature was maintained at about 300° F. The aluminum chloride was added by a number of methods. While the reactor temperature was maintained at about 303° F., from the one hundred twenty-second to the one hundred sixty-third hour of operation a pick-up drum of aluminum chloride was inserted into the hydrogen chloride stream, this drum containing lumps of anhydrous aluminum chloride. The drum temperature was maintained between about 300° F. and about 250° F. and its actual use on stream amounted to about a total of 42 hours. The vapor carrier for the aluminum chloride was the hydrogen chloride promoter, which was removed from the final product and returned to the isomerization reaction zone through the aluminum chloride drum. During this operation the activity and conversion dropped from 40% to about 20% of isobutane based on the normal butane fed. In the subsequent operation, from the one hundred seventy-sixth to the two hundred seventy-eighth hour, where the aluminum chloride pick-up drum was maintained at a temperature of about 240° F. with a reactor temperature varying from a low of about 250° F. up to a high of 303° F. and the fresh charge of aluminum chloride being on stream for a total of about 103 hours, the vapor carrier medium for the aluminum chloride was the admixture of normal butane feed stock and the hydrogen chloride promoter, and the conversions proceeded to come back up to the neighborhood of 35-40% conversion. From the two hundred ninetieth to the five hundred fifty-fifth hour a fresh charge of aluminum chloride was placed in the pick-up drum and it was used for a total of 266 hours with the drum temperature being at from 220° F. to 240° F. and the reactor temperature being maintained at about 303° F. Here the carrier employed for the aluminum chloride pick-up was only the normal butane feed stock to the exclusion of hydrogen chloride, and surprisingly not only did the conversion increase to between 48 and 52 volume per cent under the same conditions but in addition the conversion was much more consistent and uniform and there was no corrosive black liquid degradation of the aluminum chloride in the aluminum chloride pick-up drum. This operation was continued with varying fresh charges of aluminum chloride being placed in the butane feed stream to supply the amount of aluminum chloride necessay to maintain the catalyst activity until the total run of 663 hours was completed. The residual aluminum chloride in the pick-up drum which was not discharged into the catalyst mass was in excellent condition for further use in the reaction and did not contain any black non-volatile liquid residue such as had been found where the hydrogen chloride or mixtures of hydrogen chloride and normal paraffin were employed as the carrier vapors. After the six hundred sixty-third hour of operation the run was discontinued because of shut-down over a period of holidays and was not renewed although the catalyst mass was still very active at the end of this time.

In comparison with Example 1, about the same amount of aluminum chloride was taken into the isomerization reactor and about the same amount was carried overhead in the effluent. However, it is definitely shown that because of less degradation of the aluminum chloride being introduced during the isomerization the procedure as outlined in Example 2 is definitely preferable to that outlined in Example 1 or to that in which only the promoter is employed as the vapor carrier for the aluminum chloride pick-up.

*Example 3*

A further experiment was conducted in much the same manner as described with reference to Example 2 but the aluminum chloride vapors which were introduced during the run were introduced by means of normal butane exclusively.

An isomerization catalyst mass was prepared by charging the reactor with a substantially completely dehydrated Porocel having a low iron content in the amount of about 11 lbs. and placing immediately thereover in the isomerization reactor about 1.15 lbs. of anhydrous granular aluminum chloride. This catalyst mixture was then pretreated for about 24 hours at a temperature of about 325° F. under superatmospheric pressure with normal butane vapors. The final catalyst composition was about 88.1 weight per cent of Porocel and about 11.9 weight per cent of aluminum chloride and all of this aluminum chloride was substantially tenaciously held in the pores of the Porocel carrier.

For about the first 528 hours of operation of this catalyst mass the reaction conditions were maintained substantially constant at about 200 lbs./sq. in. pressure and at about 300° F. with a normal butane throughput of about 1 liquid volume of normal butane per volume of catalyst mass per hour, using about 6% by weight of hydrogen chloride promoter. Of course during such an extended period of operation slight variations in these reaction conditions occurred but in general the conditions were maintained as stated. Beginning with about the five hundred twenty-ninth hour the amount of hydrogen chloride promoter employed was dropped to and maintained at about 3% but it was found upon subsequent dropping of this amount of hydrogen chloride that there was a decided drop in activity and the hydrogen chloride concentration was brought up to between about 3% and 4% in order to maintain a 45% conversion and which was maintained up to almost 700 hours of total operation of the catalyst mass.

The feed stock employed was substantially the same as that described in Example 2 and the aluminum chloride charged to the pick-up drum through which the butane vapors were fed was charged in increments of 0.5 lb., 0.3 lb., 0.3 lb., 0.3 lb. and 0.5 lb. In general, these drums were left on stream until such time as they no longer contained appreciable amounts of aluminum chloride, and this amounted to total hours of contact of roughly from 164 up to 192 hours except in the case of one drum which was on stream at a time when the unit had the feed cut off in order to improve the mechanical operation of the unit. In no case was there any black degradation residual liquid in the aluminum chloride pick-up drums when they were taken off stream but a very small amount of light brown or yellow powder remained. The temperature maintained on the aluminum chloride pick-up drum varied throughout the run depending upon the amount of aluminum chloride introduced into the catalyst mass in order to maintain a substantially constant conversion of normal butane to isobutane. It varied from about 220° F. up to 300° F.

The yield of isobutane varied between about 35 and about 50 volume per cent based on the normal butane fed, and the selectivity of the normal butane reacted and which went to isobutane varied between about 90% and 98%. It was found, surprisingly, that when normal butane was exclusively employed as the carrier medium for the aluminum chloride vapors entering the catalyst bed that the catalyst life increased to a point far beyond that heretofore known. After a total of 528 hours of operation, 138 gallons of isobutane were produced per pound of aluminum chloride charged. This aluminum chloride included the aluminum chloride originally in the catalyst bed as well as the aluminum chloride employed throughout the experiment in the pick-up drum and which was introdnuced into the catalyst bed during the experiment. This is indeed a remarkable life of the aluminum chloride when considered in conjunction with the length of the run and has heretofore not been obtained so far as known.

Having thus fully described and illustrated the character of the invention, what is desired to be secured by Letters Patent is:

1. In a process of isomerizing normal paraffin containing at least four carbon atoms per molecule in the vapor phase by contacting the same under isomerization reaction conditions and in the presence of promotional amounts of hydrogen chloride with a catalyst mass comprising essentially a porous carrier dehydrated to a water content of less than 2% incapable of releasing any substantial amounts of free water under the isomerization reaction conditions, and containing sorbed aluminum chloride, the improvements comprising adding, at least intermittently during the isomerization process, a gasiform carrier containing aluminum chloride vapors and substantially free of halogen-containing promoters and comprising essentially only normal paraffin vapors, to the aluminum chloride catalyst mass to maintain and prolong the "on-stream" isomerization activity of the catalyst mass, limiting the amount of aluminum chloride vapors so added below that required to exceed the saturation point of the porous carrier under the prevailing isomerization reaction conditions whereby the effluent vapors from the isomerization reaction zone are substantially free of aluminum chloride.

2. A process as in claim 1 wherein the gasiform carrier is at least a portion of the isomerization feed stock.

3. In a process of isomerizing normal paraffin containing at least four carbon atoms per molecule in the vapor phase by contacting the same under isomerization reaction conditions and in the presence of promotional amounts of hydrogen chloride with a catalyst mass comprising porous alumina dehydrated to a water content of less than 2% incapable of releasing any substantial amounts of free water under the isomerization reaction conditions, and containing sorbed aluminum chloride, the improvements comprising adding, at least intermittently during the isomerization process, a gasiform carrier containing aluminum chloride vapors and substantially free of hydrogen chloride and comprising essentially only vapors of normal paraffin containing at least four carbon atoms per molecule, to the aluminum chloride catalyst mass to maintain and prolong the "on-stream" isomerization activity of the catalyst mass, limiting the amount of aluminum chloride vapors so added below that required to exceed the saturation point of the alumina carrier under the prevailing isomerization reaction conditions whereby the effluent vapors from the isomerization reaction zone are substantially free of aluminum chloride.

4. A process as in claim 3 wherein the gasiform carrier is at least a portion of the isomerization feed stock.

5. In a process of isomerizing normal paraffin containing at least four carbon atoms per molecule in the vapor phase by contacting the same under isomerization reaction conditions and in the presence of promotional amounts of hydrogen chloride with a catalyst mass comprising bauxite dehydrated to a water content of less than 2% incapable of releasing any substantial amounts of free water under the isomerization reaction conditions and containing sorbed aluminum chloride, the improvements comprising adding, at least intermittently during the isomerization process, a gasiform carrier containing aluminum chloride vapors and substantially free of hydrogen chloride and comprising essentially only normal paraffin vapors, to the aluminum chloride catalyst mass, and thus maintaining the amount of aluminum chloride sorbed in the bauxite between about 8 and about 20 weight per cent of the catalyst mass.

6. A process as in claim 5 wherein the gasiform carrier is at least a portion of the isomerization feed stock.

7. In a process of isomerizing normal butane in the vapor phase by contacting the same under isomerization reaction conditions, and in the presence of promotional amounts of hydrogen chloride, with a catalyst mass comprising bauxite dehydrated to a water content of less than 2% incapable of releasing any substantial amounts of free water under the isomerization reaction conditions and containing sorbed aluminum chloride, the improvements comprising adding, at least intermittently during the isomerization process, a gasiform carrier containing aluminum chloride vapors and consisting of normal butane, and substantially free of hydrogen chloride, to the aluminum chloride catalyst mass to maintain the amount of aluminum chloride sorbed in the bauxite between about 8 and about 20 weight per cent of the catalyst mass.

8. In a process for the production of isobutane from normal butane in the vapor phase under isomerization reaction conditions in the presence of hydrogen chloride and a catalyst mass comprising essentially aluminum chloride sorbed on a porous alumina carrier dehydrated to a water content of less than 2%, substantially freed of water of hydration and incapable of releasing further quantities of water under the isomerization reaction conditions, the improvements comprising at least intermittently during the isomerization process introducing small amounts of aluminum chloride vapors into the said catalyst mass mixed with a carrier vapor therefor substantially free from hydrogen chloride and comprising essentially only normal butane, in which sufficient aluminum chloride vapors are thus introduced into the catalyst mass to maintain its isomerization activity but not to exceed substantially complete saturation of the porous alumina under the reaction conditions maintained whereby the sorbed aluminum chloride is tenaciously held therein under the isomerization conditions maintained.

9. A process as in claim 8 in which normal pentane replaces normal butane.

10. In a process of isomerizing normal paraffins containing at least four carbon atoms per molecule in the vapor phase under isomerization reaction conditions while in contact with a hydrogen halide and a bed of aluminum chloride tenaciously sorbed in a bauxite dehydrated to a water content of less than 2%, the improvement comprising extending the length of onstream operation of the catalyst mass by simultaneously passing at least one paraffin hydrocarbon in vapor phase prior to entering the isomerization reaction zone and in substantial absence of any promotor for the isomerization reaction through a pickup zone containing extraneous aluminum chloride, passing the resultant gasiform mixture containing aluminum chloride vapors into the catalyst bed, maintaining the concentration of aluminum chloride sorbed on the partially dehydrated bauxite below its saturation point with reference to the said dehydrated bauxite under the isomerization reaction conditions whereby the aluminum chloride is substantially completely sorbed and tenaciously held in the said bauxite during the isomerization reaction.

11. In a process of isomerizing normal paraffins containing at least four carbon atoms per molecule in the vapor phase under isomerization reaction conditions while in contact with a hydrogen halide and a bed of aluminum chloride tenaciously sorbed in a bauxite dehydrated to a water content equivalent to that obtained by heating the bauxite until the water content is reduced below 2%, the improvement comprising extending the length of onstream operation of the catalyst mass by simultaneously passing at least one paraffin hydrocarbon in vapor phase prior to entering the isomerization reaction zone and in substantial absence of any promoter for the isomerization reaction through a pickup zone containing extraneous aluminum chloride, passing the resultant gasiform mixture containing aluminum chloride vapors into the catalyst bed, maintaining the concentration of aluminum chloride sorbed on the partially dehydrated bauxite below its saturation point with reference to the said dehydrated bauxite under the isomerization reaction conditions whereby the aluminum chloride is substantially completely sorbed and tenaciously held in the said bauxite during the isomerization reaction.

12. In a process of isomerizing normal paraffin containing at least four carbon atoms per molecule in the vapor phase by contacting the same under isomerization reaction conditions and in the presence of promotional amounts of hydrogen chloride with a catalyst mass comprising essentially a carrier dehydrated to a water content of less than 2% incapable of releasing any substantial amounts of free water under the isomerization reaction conditions and containing sorbed aluminum chloride, the improvements comprising adding, at least intermittently during the isomerization process, aluminum chloride vapors mixed with an inert carrier gas to the aluminum chloride catalyst mass to maintain and prolong the "on-stream" isomerization activity of the catalyst mass, limiting the amount of aluminum chloride vapors so added below that required to exceed the saturation point of the porous carrier under the prevailing isomerization reaction conditions whereby the effluent vapors from the isomerization reaction zone are substantially free of aluminum chloride.

13. A process as in claim 12 wherein a carrier gas is employed to gas strip from the aluminum chloride porous carrier catalyst mass all but the tenaciously held aluminum chloride prior to employing the catalyst mass as an isomerization catalyst.

14. A process as in claim 12 wherein a carrier gas comprising at least a portion of the paraffin feed stock to the isomerization reaction is employed for adding aluminum chloride vapors to the catalyst mass and the same carrier gas is employed to gas strip from the aluminum chloride porous carrier catalyst mass all but the tenaciously held aluminum chloride prior to employing the catalyst mass as an isomerization catalyst.

15. A process as in claim 12 wherein a carrier gas comprising an inert permanent gas is employed for adding aluminum chloride vapors to the catalyst mass and the same carrier gas is employed to gas strip from the aluminum chloride porous carrier catalyst mass all but the tenaciously held aluminum chloride prior to employing the catalyst mass as an isomerization catalyst.

16. In a process of isomerizing normal paraffin containing at least four carbon atoms per molecule in the vapor phase by contacting the same under isomerization reaction conditions and in the presence of promotional amount of hydrogen chloride with a catalyst mass comprising essentially a carrier dehydrated to a water content of less than 2% incapable of releasing any substantial amounts of free water under the isomerization reaction conditions and containing sorbed aluminum chloride, the improvements comprising forming the catalyst mass by adding aluminum chloride vapors, mixed with a substantially inert carrier gas, to the said porous carrier, maintaining the concentration of aluminum chloride sorbed on the said porous carrier below its saturation point with reference to said porous carrier under the isomerization reaction conditions by stripping the catalyst mass with the inert carrier gas while substantially under said conditions until substantially no aluminum chloride vapors are present in the off gases, employing the catalyst mass so prepared as the isomerization catalyst mass and subsequently adding aluminum chloride vapors to the catalyst mass at least intermittently during the "on-stream" isomerization reaction.

17. A process as in claim 16 wherein the carrier gas comprises at least a portion of the paraffin feed stock.

18. A process as in claim 16 wherein the carrier gas comprises hydrogen chloride.

19. In a process of isomerizing normal paraffin containing at least four carbon atoms per molecule in the vapor phase by contacting the same under isomerization reaction conditions and in the presence of promotional amounts of hydrogen chloride with a catalyst mass comprising essentially a carrier dehydrated to a water content of less than 2% incapable of releasing any substantial amounts of free water under the isomerization reaction conditions and containing sorbed aluminum chloride, the improvements comprising adding, at least intermittently during the isomerization process, aluminum chloride vapors mixed with an inert carrier gas to the aluminum chloride catalyst mass to maintain and prolong the "on-stream" isomerization activity of the catalyst mass, limiting the amount of aluminum chloride vapors so added below that required to exceed the saturation point of the porous alumina carrier under the prevailing isomerization reaction conditions whereby the effluent vapors from the isomerization reaction zone are substantially free of aluminum chloride.

20. A process as in claim 19 wherein a carrier gas is employed to gas strip from the aluminum chloride porous alumina carrier catalyst mass all but the tenaciously held aluminum chloride prior to employing the catalyst mass as an isomerization catalyst.

21. A process as in claim 19 wherein a carrier gas comprising at least a portion of the paraffin feed stock to the isomerization reaction is employed for adding aluminum chloride vapors to the catalyst mass and the same carrier gas is employed to gas strip from the aluminum chloride porous alumina carrier catalyst mass all but the tenaciously held aluminum chloride prior to employing the catalyst mass as an isomerization catalyst.

22. In a process of isomerizing normal paraffin containing at least four carbon atoms per molecule in the vapor phase by contacting the same under isomerization reaction conditions and in the presence of promotional amounts of hydrogen chloride with a catalyst mass comprising essentially a bauxite dehydrated to a water content of less than 2% incapable of releasing any substantial amounts of free water under the isomerization reaction conditions and containing sorbed aluminum chloride, the improvements comprising adding, at least intermittently during the isomerization process, aluminum chloride vapors mixed with an inert carrier gas to the aluminum chloride catalyst mass to maintain and prolong the "on-stream" isomerization activity of the catalyst mass, limiting the amount of aluminum chloride vapors so added below that required to exceed the saturation point of the bauxite carrier under the prevailing isomerization reaction conditions whereby the effluent vapors from the isomerization reaction zone are substantially free of aluminum chloride.

23. A process as in claim 22 wherein a carrier gas is employed to gas strip from the aluminum chloride bauxite carrier catalyst mass all but the tenaciously held aluminum chloride prior to employing the catalyst mass as an isomerization catalyst.

24. A process as in claim 22 wherein a carrier gas comprising at least a portion of the paraffin feed stock to the isomerization reaction is employed for adding aluminum chloride vapors to the catalyst mass and the same carrier gas is employed to gas strip from the aluminum chloride bauxite carrier catalyst mass all but the tenaciously held aluminum chloride prior to employing the catalyst mass as an isomerization catalyst.

25. In a process of isomerizing normal butane to produce isobutane in the vapor phase by contacting the same under isomerization reaction conditions and in the presence of promotional amounts of hydrogen chloride with a catalyst mass comprising essentially a bauxite dehydrated to a water content of less than 2% incapable of releasing any substantial amounts of free water under the isomerization reaction conditions and containing sorbed aluminum chloride, the improvements comprising adding, at least intermittently during the isomerization process, aluminum chloride vapors mixed with an inert carrier gas to the aluminum chloride catalyst mass to maintain the amount of aluminum chloride sorbed in the said bauxite between about 8 and about 20 weight per cent of the catalyst mass.

26. A process as in claim 25 wherein a carrier gas is employed to gas strip from the aluminum chloride bauxite carrier catalyst mass all but the tenaciously held aluminum chloride prior to employing the catalyst mass as an isomerization catalyst.

27. A process as in claim 25 wherein a carrier gas comprising at least a portion of the paraffin feed stock to the isomerization reaction is employed for adding aluminum chloride vapors to the catalyst mass and the same carrier gas is employed to gas strip from the aluminum chloride bauxite carrier catalyst mass all but the tenaciously held aluminum chloride prior to employing the catalyst mass as an isomerization catalyst.

28. In a process of isomerizing normal paraffin containing at least four carbon atoms per molecule in the vapor phase by contacting the same under isomerization reaction conditions in the presence of promotional amounts of hydrogen chloride with a catalyst mass comprising essentially a bauxite dehydrated to a water content of less than 2% incapable of releasing any substantial amounts of free water under the isomerization reaction conditions and containing between about 8 and about 20 weight per cent of aluminum chloride sorbed therein, the improvements comprising forming the catalyst mass by adding aluminum chloride vapors, at a temperature above 185° F. but below the temperature maintained in the isomerization reaction zone, to the said porous carrier, maintaining the concentration of aluminum chloride within the above-stated limits and under the isomerization reaction conditions tenaciously held by stripping the catalyst mass with an inert gasiform carrier while substantially under the said conditions until substantially no aluminum chloride vapors are present in the off gases, employing the mass as the isomerization catalyst mass and subsequently adding aluminum chloride vapors mixed with an inert carrier gas to the catalyst mass at least intermittently during the "on-stream" isomerization reaction to maintain the above-stated amounts of tenaciously held aluminum chloride.

29. A process as in claim 28 wherein the carrier gas comprises at least a portion of the paraffin feed stock.

30. A process as in claim 28 wherein the carrier gas comprises hydrogen chloride.

NORVAL F. MYERS.

(References on following page)

REFERENCES CITED

The following references are of record in the file of this patent:

UNITED STATES PATENTS

| Number | Name | Date |
|---|---|---|
| 2,277,022 | McMillan et al. | Mar. 17, 1942 |
| 2,254,618 | McMillan et al. | Sept. 2, 1941 |
| 2,274,624 | McMillan | Feb. 24, 1942 |
| 2,281,924 | de Simo et al. | May 5, 1942 |
| 1,381,098 | Alexander | June 14, 1921 |
| 2,277,512 | de Simo et al. | Mar. 24, 1942 |
| 1,716,372 | Downs | June 11, 1929 |
| 2,301,615 | Chenicek et al. | Nov. 10, 1942 |
| 2,342,124 | Danforth | Feb. 22, 1944 |
| 2,309,263 | Thomas | Jan. 26, 1943 |
| 2,342,123 | Danforth | Feb. 22, 1944 |
| 2,314,297 | Watson | Mar. 16, 1943 |
| 2,323,830 | McMillan | July 6, 1943 |
| 2,311,712 | Thomas | Feb. 23, 1943 |
| 2,311,713 | Thomas et al. | Feb. 23, 1943 |